US012651814B2

(12) United States Patent
Su et al.

(10) Patent No.: US 12,651,814 B2
(45) Date of Patent: Jun. 9, 2026

(54) BATTERY CABINET

(71) Applicant: CONTEMPORARY AMPEREX TECHNOLOGY (HONG KONG) LIMITED, Hong Kong (CN)

(72) Inventors: Haibin Su, Ningde (CN); Hao Luo, Ningde (CN); Zengzhong Wang, Ningde (CN); Haoran Peng, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 220 days.

(21) Appl. No.: 18/420,715

(22) Filed: Jan. 23, 2024

(65) Prior Publication Data
US 2024/0170823 A1     May 23, 2024

Related U.S. Application Data

(63) Continuation of application No. PCT/CN2022/102964, filed on Jun. 30, 2022.

(30) Foreign Application Priority Data

Aug. 30, 2021     (CN) .......................... 202111005838.6

(51) Int. Cl.
*F16K 31/06*          (2006.01)
*H01M 50/673*      (2021.01)
(Continued)

(52) U.S. Cl.
CPC ........... *H01M 50/691* (2021.01); *F16K 31/06* (2013.01); *H01M 50/673* (2021.01); *H01M 50/251* (2021.01)

(58) Field of Classification Search
None
See application file for complete search history.

(56) References Cited

U.S. PATENT DOCUMENTS 2,069,297 A * 2/1937 Abercrombie .......... F16K 15/06
137/902
5,997,049 A * 12/1999 Kingsford ............. F16L 15/008
29/525
(Continued)

FOREIGN PATENT DOCUMENTS

CN          201753789 U       3/2011
CN          206213746 U       6/2017
(Continued)

OTHER PUBLICATIONS

International Search Report received in the corresponding International Application PCT/CN2022/102964, mailed Sep. 23, 2022.
(Continued)

*Primary Examiner* — Umashankar Venkatesan
(74) *Attorney, Agent, or Firm* — K&L Gates LLP

(57) ABSTRACT

Provided are a battery cabinet including a cabinet body and a drain valve assembly. The bottom of the drain valve assembly is fixed, by an installation port at the bottom of the cabinet body, to the battery cabinet from bottom to top, and the top of the drain valve assembly is in butt joint with a drain outlet in the cabinet body. The drain valve assembly is provided with magnetic substances, which can realize automatic drainage. Compared with a method for installing a drain valve assembly from the inside of a battery cabinet in the prior art, the operation of fixing the drain valve assembly through the installation port in the present application is more convenient, the drain valve assembly can be disassembled without moving battery cells in the cabinet, and thus convenience of disassembly and assembly of the drain valve assembly is improved.

10 Claims, 6 Drawing Sheets

(51) Int. Cl.
*H01M 50/691* (2021.01)
*H01M 50/251* (2021.01)

(56) References Cited

U.S. PATENT DOCUMENTS

| | | | | |
|---|---|---|---|---|
| 10,183,574 B2* | 1/2019 | Vulkan | ................. | F16K 15/023 |
| 11,165,102 B2* | 11/2021 | Ogawa | ................. | H01M 10/345 |
| 11,398,655 B2* | 7/2022 | Cho | ..................... | H01M 50/668 |
| 11,519,510 B1* | 12/2022 | Otaibi | ..................... | F16K 15/06 |
| 11,857,761 B2* | 1/2024 | Thakore | ................ | F16K 15/023 |
| 2007/0044846 A1* | 3/2007 | Ashurst | ................. | F16K 15/023 |
| | | | | 137/533.13 |
| 2014/0335388 A1 | 11/2014 | Jin | | |
| 2017/0343124 A1* | 11/2017 | Zimmer | ................ | F16K 15/141 |
| 2022/0042613 A1* | 2/2022 | Arteta Unanua | ....... | F16K 17/40 |
| 2022/0369481 A1* | 11/2022 | Yano | ...................... | B01D 69/10 |
| 2023/0361440 A1* | 11/2023 | Matsushita | ......... | H01M 50/367 |
| 2024/0142018 A1* | 5/2024 | Denoth | ................. | F16K 31/084 |

FOREIGN PATENT DOCUMENTS

| | | | |
|---|---|---|---|
| CN | 206412401 U | 8/2017 |
| CN | 206864570 U | 1/2018 |
| CN | 107887537 A | 4/2018 |
| CN | 108396848 A | 8/2018 |
| CN | 208657212 U | 3/2019 |
| CN | 109572919 A | 4/2019 |
| CN | 210663310 U | 6/2020 |
| CN | 210852107 U | 6/2020 |
| CN | 211575725 U | 9/2020 |
| JP | 2014156958 A | 8/2014 |

OTHER PUBLICATIONS

Written Opinion of ISA received in the corresponding International Application PCT/CN2022/102964, mailed Sep. 23, 2022.
First office action received in the corresponding Chinese Application 202111005838.6, issued on Sep. 1, 2023.
Second office action received in the corresponding Chinese Application 202111005838.6, issued on Oct. 19, 2023.
Rejection Decision received in the corresponding Chinese Application 202111005838.6, issued on Dec. 28, 2023.
Extended Search Report issued to related EP Patent Application No. 22862855.8, dated Dec. 17, 2024, 8 pages.
The Reexamination Decision received in the corresponding Chinese Application 202111005838.6, mailed on Aug. 6, 2024.
The Reexamination Notice received in the corresponding Chinese Application 202111005838.6, mailed on Jun. 20, 2024.

* cited by examiner

A

2

111

1111 1112

21

BATTERY CABINET

CROSS-REFERENCE TO RELATED APPLICATIONS

The present application is a continuation of International Application No. PCT/CN2022/102964, filed on Jun. 30, 2022, which claims priority to Chinese Patent Application No. 202111005838.6, filed on Aug. 30, 2021 and entitled "BATTERY CABINET", the entire contents of which are incorporated herein by reference.

TECHNICAL FIELD

The present application relates to the technical field of batteries, and in particular, to a battery cabinet for energy storage.

BACKGROUND

A battery cabinet is an important part of a battery energy storage system, and battery cells are stored in the battery cabinet. In order to ensure the normal operation of the battery cabinet and prevent moisture from damaging batteries, the battery cabinet is provided with a drain part to drain internal accumulated water.

When the existing drain part is assembled or disassembled, steps are complex, and the operation is difficult. Therefore, how to realize the convenient disassembly and assembly of the drain part of the battery cabinet has become an urgent problem to be solved.

SUMMARY OF THE INVENTION

The present application provides a battery cabinet to improve the convenience of disassembly and assembly of a drain part of the battery cabinet.

The present application provides a battery cabinet including a cabinet body and a drain valve assembly. The cabinet body includes an upper cabinet body and a lower cabinet body, and the upper cabinet body is used for accommodating battery cells. The bottom of the upper cabinet body is provided with an upper cabinet body bottom plate, and the upper cabinet body bottom plate is provided with a drain outlet. The lower cabinet body includes a lower cabinet body bottom plate which is provided with a drain valve installation port. The drain valve assembly is installed in the drain valve installation port and is in butt joint with the drain outlet. Compared with a method for installing a drain valve assembly from the inside of a battery cabinet in the prior art, the operation of fixing the drain valve assembly through the drain valve installation port is more convenient, and the drain valve assembly can be disassembled without moving the battery cells in the cabinet. In addition, since the drain valve assembly is installed in the lower cabinet body, the occupation of an internal space of the upper cabinet body by the drain valve assembly is reduced so that energy density of the battery cabinet can be improved.

In some embodiments, the drain valve assembly is installed in the drain valve installation port from bottom to top. Since an internal space of the lower cabinet body is narrow and is obstructed, a bottom-to-top installation manner is easier to operate.

In some embodiments, the drain valve assembly includes a drain valve, a mounting plate, a frame and a connecting bottom plate. The mounting plate is connected to an inner wall of the frame, the drain valve is in sealed connection to the mounting plate, the connecting bottom plate is arranged at the bottom of the frame, and the frame is connected to a bottom surface of the lower cabinet body bottom plate through the connecting bottom plate. The frame plays a role of connecting the mounting plate with the connecting bottom plate, the mounting plate can fix the drain valve, and the connecting bottom plate realizes connection between the drain valve assembly and the battery cabinet.

In some embodiments, the drain valve assembly further includes a first sealing member through which the drain valve is in sealed connection to the mounting plate, thereby improving sealing performance between the drain valve and the mounting plate.

In some embodiments, the drain valve assembly further includes a second sealing member, and the second sealing member is arranged between the connecting bottom plate and the lower cabinet body bottom plate to improve sealing performance between the connecting bottom plate and the lower cabinet body bottom plate.

In some embodiments, the upper cabinet body bottom plate includes a water guide plate and a water guide box. An upper end of the water guide box is connected to the water guide plate, and a lower end of the water guide box is in butt joint with the drain valve assembly. Water flow in the cabinet body flows, along the water guide plate, to the drain valve assembly via the water guide box and is finally discharged out of the battery cabinet to realize one-way drainage.

In some embodiments, the water guide box is arranged on the side, close to a door panel of the battery cabinet, of the upper cabinet body bottom plate so that the drain valve assembly can be disassembled and assembled without entering the battery cabinet, which reduces the operation difficulty of disassembling and assembling.

In some embodiments, a lower edge of the water guide box is lower than an upper edge of the frame of the drain valve assembly, so that the frame sleeves the water guide box, which can prevent the water flow from splashing out of the drain valve assembly.

In some embodiments, the water guide plate is provided with a drainage structure, and the drainage structure downwards inclines towards the position of the water guide box so that accumulated water can flow out of the battery cabinet to the greatest extent.

In some embodiments, the drain valve includes a valve core assembly and a shell, and the valve core assembly is arranged in the shell. The shell is of a cylindrical structure, and the top of the cylindrical structure is provided with an outwards-turned edge. The water flow can be collected by the outwards-turned edge.

In some embodiments, the valve core assembly includes a metal valve core, a guide rod and a third sealing member. The metal valve core movably sleeves the guide rod, and the guide rod is provided with magnetic substances. When downward acting force exerted on the metal valve core is greater than a preset value, the drain valve is opened to realize automatic drainage. The magnetic substances control the valve core assembly to be opened and closed so that automatic drainage can be accurately realized; and sealing performance of the valve core assembly can be improved by the third sealing member.

In the battery cabinet provided by the present application, the battery cabinet includes the cabinet body and the drain valve assembly. The drain valve assembly is detachably fixed to the drain valve installation port in the lower cabinet body bottom plate, and the drain valve assembly can be easily assembled and disassembled. The drain valve assembly is installed in the lower cabinet body so as to avoid the occupation of the internal space of the upper cabinet body, accordingly, the upper cabinet body can accommodate more battery cells, and the energy density of the battery cabinet is improved. Therefore, the embodiment of the present application can realize the convenient disassembly and assembly of the drain valve assembly of the battery cabinet, and meanwhile achieve good drainage and sealing effects.

DESCRIPTION OF DRAWINGS

In order to illustrate technical solutions of embodiments of the present application more clearly, drawings required in the embodiments of the present application are simply introduced below. Obviously, the drawings described below are only some embodiments of the present application. For those of ordinary skill in the art, other drawings can also be obtained according to the drawings without any creative work.

DESCRIPTION OF REFERENCE NUMERALS

Figure 1:
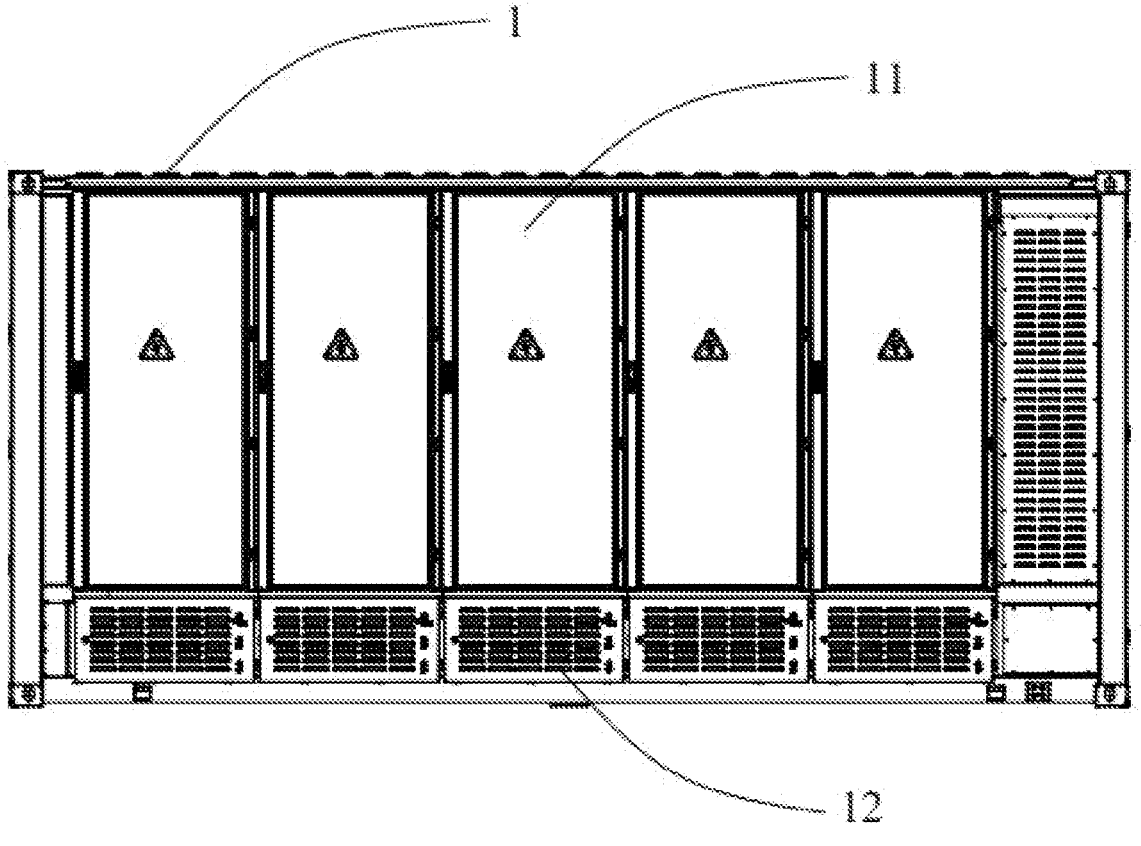
FIG. 1 is a schematic diagram of a battery cabinet disclosed by an embodiment of the present application.

1—cabinet body; 11—upper cabinet body; 111—upper cabinet body bottom plate; 1111—water guide plate; 1112—water guide box; 112—drain outlet; 12—lower cabinet body; 121—lower cabinet body bottom plate; 1211—first nut; 1212—first bolt; 122—drain valve installation port;

2—drain valve assembly; 21—drain valve; 211—valve core assembly; 2111—metal valve core; 2112—guide rod; 2113—third sealing member; 212—shell; 22—mounting plate; 221—second nut; 222—second bolt; 23—frame; 24—connecting bottom plate; 241—first through hole; 25—first sealing member; 26—second sealing member; 261—second through hole; and 27—upper pressing plate.

DETAILED DESCRIPTION

Implementation modes of the present application are further described in detail below with reference to drawings and embodiments. The following detailed description of the embodiments and the drawings are used to illustrate principles of the present application by way of example, but should not be used to limit the scope of the present application, and in other words, the present application is not limited to the described embodiments.

In the description of the present application, it should be noted that, unless otherwise stated, "plurality of" means two or more; the orientation or positional relationships indicated by the terms such as "upper", "lower", "left", "right", "inner" and "outer" are only for facilitating the description of the present application and simplifying the description, rather than indicating or implying that an apparatus or element referred to must have a particular orientation or be constructed and operated in a particular orientation, and therefore will not be interpreted as limiting the present application. In addition, the terms such as "first", "second" and "third" are only used for describing purposes, but cannot be understood as indicating or implying relative importance. "Vertical" is not strictly vertical, but within the allowable range of error. "Parallel" is not strictly parallel, but within the allowable range of error.

A references herein to "an embodiment" in the present application means that a particular feature, structure, or characteristic described in combination with the embodiment can be included in at least one embodiment of the present application. The appearance of this phrase in various places in the Description does not necessarily refer to the same embodiment, nor is it a separate or alternative embodiment that is mutually exclusive from other embodiments. It is understood explicitly and implicitly by those skilled in the art that the embodiments described in the present application can be combined with other embodiments.

Orientation words appearing in the following description are directions shown in the drawings, and do not limit a specific structure of the present application. In the description of the present application, it should be further noted that the terms "mounting", "connecting" and "connection" should be understood in a broad sense, unless otherwise explicitly specified or defined. For example, it may be a fixed connection, a detachable connection, or an integrated connection; and it may be a direct connection or an indirect connection through an intermediate medium. For those of ordinary skill in the art, the specific meanings of the above terms in the present application may be understood according to specific circumstances.

In the present application, the term "and/or" is only an association relationship for describing associated objects, indicating that three relationships may exist. For example, A and/or B may represent three situations: A exists alone, both A and B exist, and B exists alone. In addition, the character "I" in the present application generally means that the associated objects before and after it are in an "or" relationship.

In the embodiments of the present application, the same drawing reference numerals denote the same components, and for the sake of brevity, detailed descriptions of the same components are omitted in different embodiments. It should be understood that the thickness, length, width and other dimensions of the various components in the embodiments of the present application shown in the drawings, as well as the overall thickness, length, width and other dimensions of an integrated device, are for illustrative descriptions only, and should not constitute any limitation to the present application.

"Plurality of" in the present application refers to two or more (including two).

An energy storage battery cabinet has been more and more widely used in the fields of new energy, a smart grid, an energy-saving technology, etc. Battery cells are arranged inside the battery cabinet. The battery cells release heat during charging and discharging. In order to prevent the temperature of the battery cells from being too high, a cooling system is installed in the battery cabinet. However, when gas in the battery cabinet encounters condensed water at a lower temperature in a cooling pipe, the gas will condense into moisture on an outer wall of the pipe. If the moisture inside the battery cabinet cannot be drained in time, the battery cells will be damaged. Therefore, the battery cabinet is required to have a high waterproof level. In order to solve the drainage problem of the battery cabinet, the existing battery cabinet is provided with a drain outlet or a drain part. On one hand, the drain outlet is a through hole in a bottom plate of the battery cabinet. This type of solution has poor sealing performance, and corrosive gas outside a cabinet body can enter the cabinet and erode internal components of the battery cabinet. On the other hand, although the installation of the drain part on the bottom plate of the battery cabinet can achieve one-way sealed drainage, it is difficult to operate because a worker needs to enter the battery cabinet when installing the drain part, and to move the battery cells in the cabinet when detaching the drain part. Therefore, the inventor found out through research on this kind of battery cabinet that an installation port is formed in the bottom plate of the battery cabinet so that the drain part can be installed or detached from bottom to top, which increases the convenience of operation. In addition, the one-way sealed drainage of the battery cabinet can be achieved, and sealing performance is improved. Moreover, the occupation of the internal space of the battery cabinet by the drain part can be reduced, and the energy density of the battery cabinet is improved.

The present application discloses a battery cabinet, which can be used in technical fields such as wind power plants, photovoltaic power plants and other new energy power plants or micro-grids.

Referring to FIG. 1 to FIG. 4, the embodiment of the present application discloses a battery cabinet. The battery cabinet includes a cabinet body 1 and a drain valve assembly 2. The cabinet body 1 includes an upper cabinet body 11 and a lower cabinet body 12, and the upper cabinet body 11 is used for accommodating battery cells. An upper cabinet body bottom plate 111 is arranged at the bottom of the upper cabinet body 11, and provided with a drain outlet 112. The lower cabinet body 12 includes a lower cabinet body bottom plate 121 which is provided with a drain valve installation port 122. A drain valve assembly 2 is arranged in the drain valve installation port 122 and is in butt joint with the drain outlet 112.

The battery cabinet is a group of batteries composed of several battery cells, the cabinet body, a battery management system, installation structural parts, related functional components, etc., and has a battery cabinet structure, battery cabinet monitoring equipment, battery cabinet connectors, etc. meeting standards. The battery cabinet generally combines the multiple battery cells together as a power supply for use. The types of battery cabinets are distinguished according to the specifications, quantity and placement manners of battery cells, and can be divided into a vertical type, a horizontal type, etc. The battery cells may include a lithium-ion battery, a lithium-sulfur battery, a sodium-ion battery or a magnesium-ion battery, or the like, which are not limited by the embodiments of the present application. The battery management system is a control system for protecting use safety of power batteries, and mainly aims to intelligently manage and maintain various battery units, prevent the batteries from overcharging and overdischarging, prolong the service life of the batteries, and monitor states of the batteries. The installation structural parts may include a holder, a bracket, etc., which are not limited by the embodiments of the present application. The related functional components may include heat dissipation components, cooling components, thermal insulation components, drain parts, etc., which are not limited by the embodiments of the present application.

The cabinet body 1 refers to a main part of the battery cabinet, and the cabinet body 1 has spaces for placing the battery cells and other components. The cabinet body 1 may be a rectangular cabinet body, which is not limited by the embodiments of the present application. The cabinet body 1 may include a frame and a top plate, a bottom plate and side plates covering a surface of the frame. The top plate, the bottom plate and the side plates may be connected to the frame by welding, riveting, bolts, etc. The top plate, the bottom plate and the side plates may be connected by welding. An interior of the cabinet body 1 may be divided into several parts. For example, the cabinet body 1 is divided into the upper cabinet body 11 and the lower cabinet body 12. The upper cabinet body 11 can accommodate the several battery cells, and the lower cabinet body 12 can accommodate pipes or other functional components.

The bottom plate of the battery cabinet is located at a lower edge of the cabinet body 1 and is a load-bearing component of the battery cabinet. The bottom plate has basic safety performance such as stone impact resistance and scratch resistance. According to the position of the bottom plate in the battery cabinet, the bottom plate can be divided into the upper cabinet body bottom plate 111 and the lower cabinet body bottom plate 121. The upper cabinet body bottom plate 111 is located at a lower edge of the upper cabinet body 11 and divides the cabinet body 1 into the upper cabinet body 11 and the lower cabinet body 12. The lower cabinet body bottom plate 121 is located at a lower edge of the lower cabinet body 12, separates the interior of the battery cabinet from an external environment, and can prevent external gas, dust, moisture, etc. from entering the battery cabinet.

The drain valve assembly 2 is an assembly with a drainage function composed of a plurality of components, and the components cooperate with one another to realize one-way sealed drainage. The drain valve assembly 2 has a function of discharging accumulated water inside the cabinet body 1. The drain valve assembly 2 is installed at the drain valve installation port 122 through a connecting bottom plate 24. An upper end of the drain valve assembly 2 is in butt with the drain outlet 112. The number of drain valve assemblies 2 is determined according to the capacity of the battery cabinet and the amount of drained condensed water, and may be one or more. During use of the battery cabinet, moisture is generated and deposited on the upper cabinet body bottom plate 111. The moisture flows to the drain outlet 112 due to gravity, and then is discharged out of the battery cabinet through the drain valve assembly 2.

The drain valve installation port 122 is located in the lower cabinet body bottom plate 121 for fixing the drain valve assembly 2. The shape of the drain valve installation port 122 may be square or circular, which is not limited by the embodiments of the present application. The number of drain valve installation ports 122 is matched with the number of the drain valve assemblies 2 and may be one or more.

Figure 5:
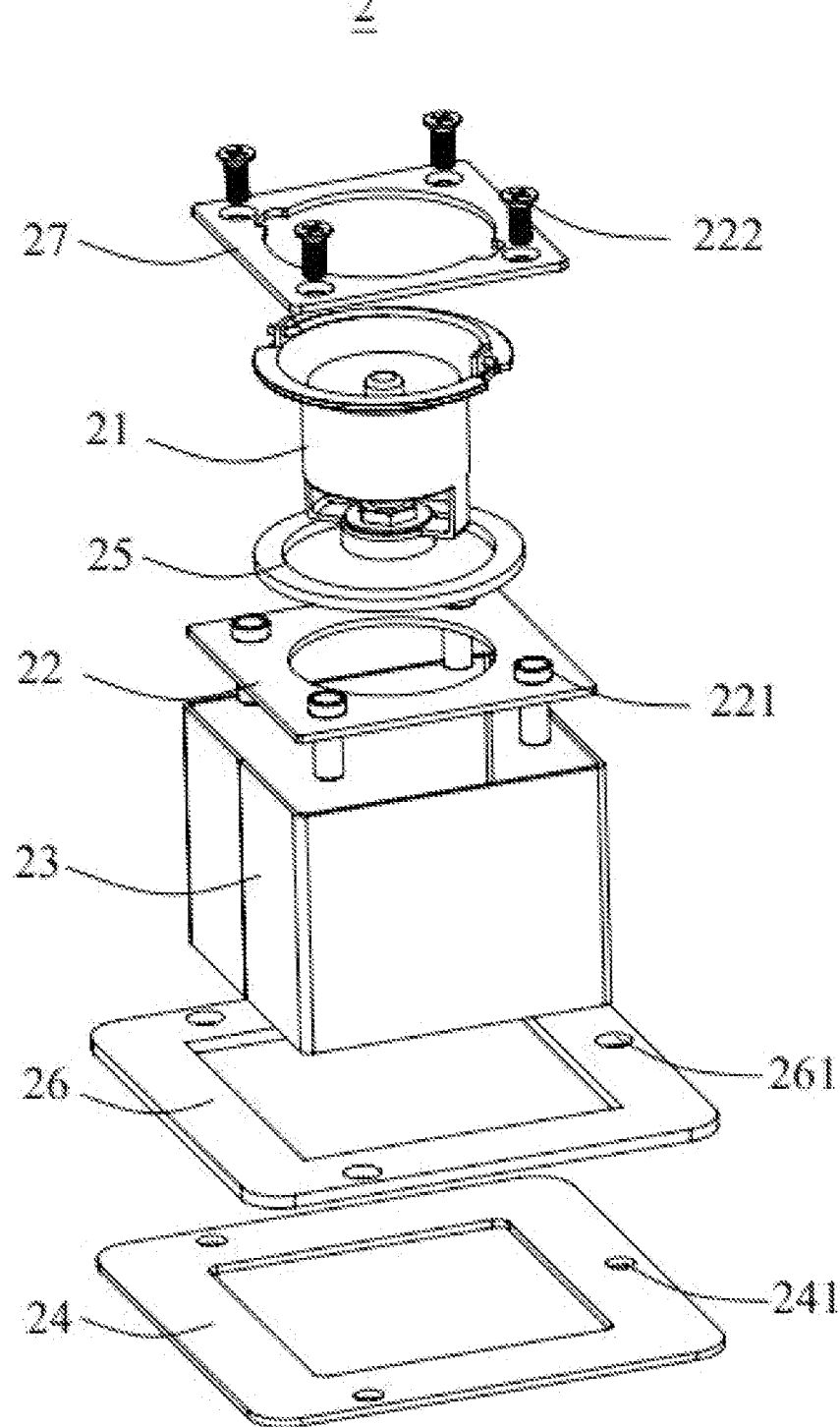
FIG. 5 is an exploded view of a drain valve assembly disclosed by an embodiment of the present application.

The connecting bottom plate 24 is a component connecting the drain valve assembly 2 with the battery cabinet. The connecting bottom plate 24 is welded to the bottom of the frame 23. Referring to FIG. 5, the connecting bottom plate 24 is provided with first through holes 241, and first bolts 1212 can penetrate through the first through holes 241 to fix the drain valve assembly 2. Specifically, the lower cabinet body bottom plate 121 is provided with first nuts 1211. During installation, the drain valve assembly 2 is aligned with the drain valve installation port 122; and the first through holes 241 in the connecting bottom plate 24 are aligned with nut bottom holes of the first nuts 1211, and the drain valve assembly 2 is fixed to the lower cabinet body 12 by the first bolts 1212. Correspondingly, during dismounting, the drain valve assembly 2 can be dismounted only by loosening the first bolts 1212.

Furthermore, one or more first through holes 241 may be arranged according to practical applications, which are not limited by the embodiments of the present application. In consideration of space utilization, three first through holes 241 may be arranged. Correspondingly, the number of the first bolts 1212 is also three. Relative positions of the plurality of first through holes 241 are set according to practical applications. For example, considering stability and convenience of installation, the relative positions of the three first through holes 241 are set as a triangle to ensure uniform stress and form a stable support.

The drain outlet 112 is a through hole located in the upper cabinet body bottom plate 111, and the accumulated water flows out of the upper cabinet body 11 through the drain outlet 112. The quantity, shape and position of drain outlets 112 are set according to practical applications. In some embodiments, there may be one or more drain outlets 112; the shape of the drain outlet 112 may be circular, square or other shapes; and the position of the drain outlet 112 may be arranged in an edge of the upper cabinet body bottom plate 111. After being installed, the drain valve assembly 2 is in butt joint with the drain outlet 112, so that the water flows into the drain valve assembly 2 through the drain outlet 112, thereby preventing the water flow from infiltrating into the lower cabinet body 12 and damaging other components in the lower cabinet body 12.

According to the embodiment of the present application, the drain valve assembly 2 is detachably fixed to the lower cabinet body bottom plate 121. Compared with a method for installing a drain part from the inside of a battery cabinet in the prior art, the operation of fixing the drain valve assembly 2 through the drain valve installation port 122 is more convenient and flexible, and the installation can be completed without entering the battery cabinet. When the drain valve assembly 2 is disassembled, there is no need to move the battery cells in the cabinet. In addition, since the drain valve assembly 2 is installed in the lower cabinet body 12, the occupation of an internal space of the upper cabinet body 11 by the drain valve assembly 2 is reduced so that the upper cabinet body 11 can accommodate more battery cells, and the energy density of the battery cabinet is improved.

Figure 2:
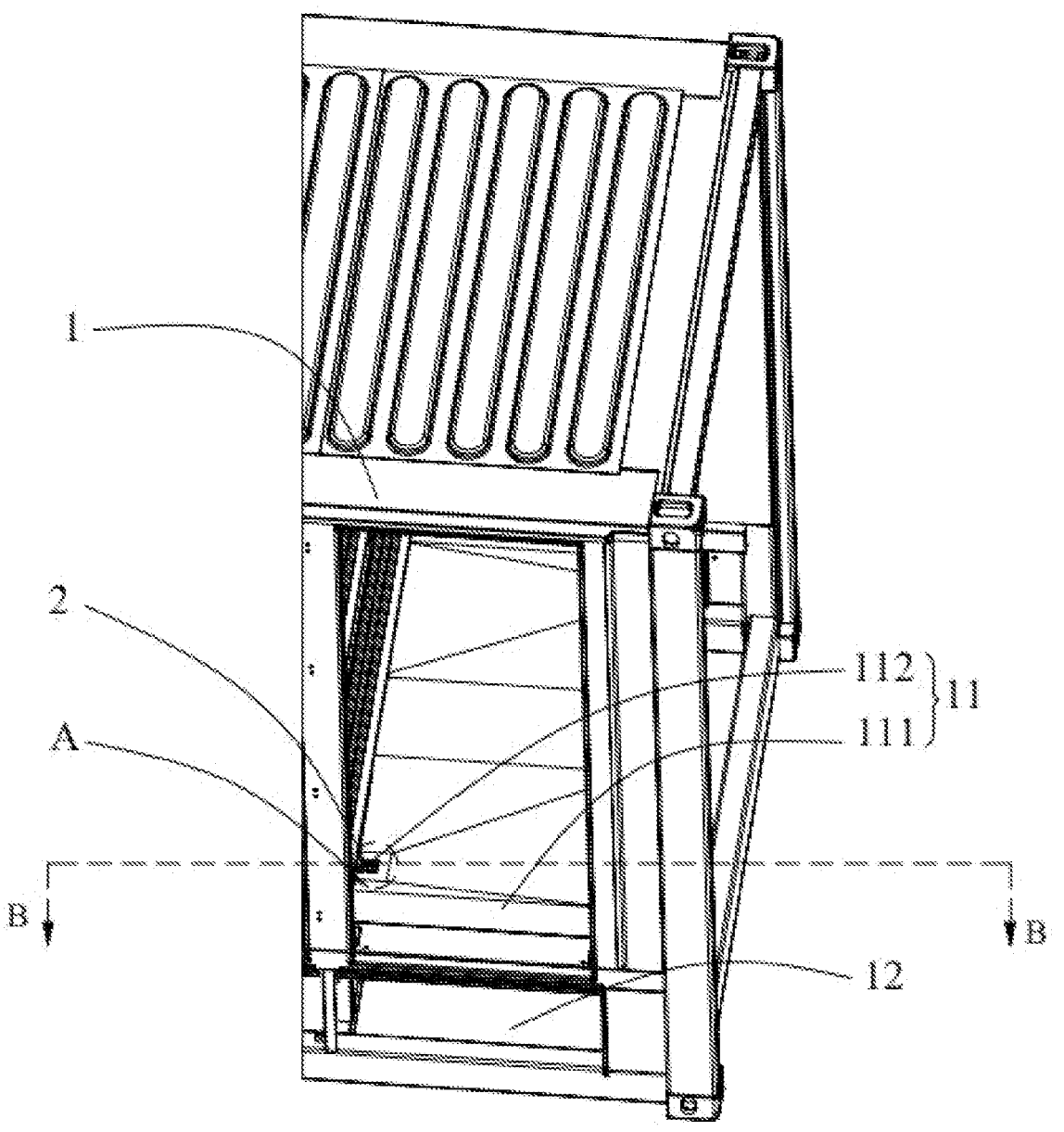
FIG. 2 is a schematic installation diagram of a drain valve assembly disclosed by an embodiment of the present application.
Figure 3:
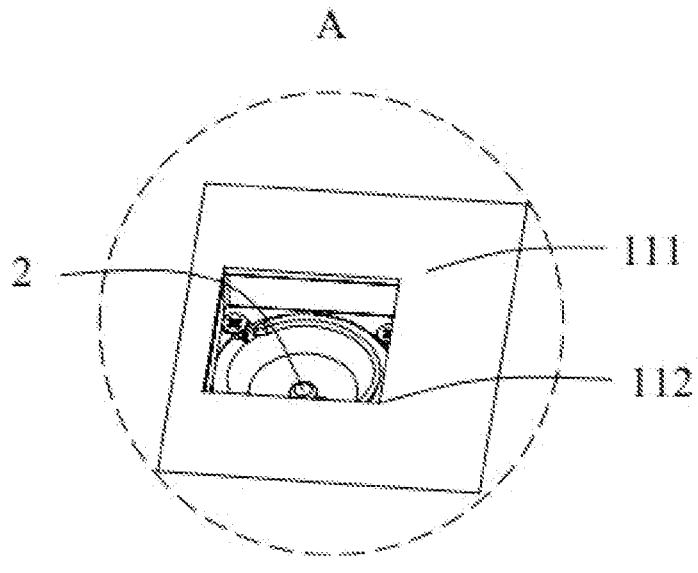
FIG. 3 is an enlarged view of a dotted circle part A in FIG. 2.

Referring to FIG. 2 and FIG. 3, the drain valve assembly 2 is installed in the drain valve installation port 122 from bottom to top.

Bottom-to-top installation means that the drain valve assembly 2 is fixed through the connecting bottom plate 24 at the bottom, and the top of the drain valve assembly 2 is not connected to the upper cabinet body 11. Specifically, the first bolts 1212 firstly pass through the first through holes 241 in the connecting bottom plate 24 and then are connected to the first nuts 1211 on the lower cabinet body bottom plate 121. The drain valve assembly 2 can be installed on the lower cabinet bottom plate 121 when the cabinet body 1 is manufactured, or can be installed on the lower cabinet bottom plate 121 after the cabinet body 1 is manufactured.

According to the embodiment of the present application, compared with a method for installing a drain part from top to bottom in the prior art, the bottom-to-top installation of the drain valve assembly 2 can be achieved without entering the lower cabinet body 12, which reduces the operation difficulty of disassembly and assembly. In addition, when the internal space of the lower cabinet body 12 is narrow or is blocked by other components, the bottom-to-top installation manner is more convenient and feasible.

Referring to FIG. 5, the drain valve assembly 2 includes a drain valve 21, a mounting plate 22, the frame 23 and the connecting bottom plate 24. The mounting plate 22 is connected to an inner wall of the frame 23, the drain valve 21 is in sealed connection to the mounting plate 22, the connecting bottom plate 24 is arranged at the bottom of the frame 23, and the frame 23 is connected to a bottom surface of the lower cabinet body bottom plate 121 through the connecting bottom plate 24.

The drain valve 21 is a valve widely used in the water industry, is used for liquid discharge or liquid level control, is mainly used in cities, buildings, enterprise water supply and drainage projects, industrial and domestic sewage treatment, water conservancy projects and other fields. There are many types of drain valves 21, which can be divided into automatic, power-driven and manual according to power modes, and can be divided into a stop valve, a check valve, a ball valve, a steam trap, etc. according to purposes and functions. Different valves are suitable for different scenarios.

The frame 23 is a component for accommodating and supporting the drain valve 21, and can connect various components of the drain valve assembly 2. The frame 23 may be made of a metal alloy, etc., which is not limited by the embodiments of the present application. The shape of the frame 23 may be a cube, which is not limited by the embodiments of the present application.

The mounting plate 22 is a component for mounting and fixing the drain valve 21. The mounting plate 22 is embedded in the frame 23, and the mounting plate 22 and the frame 23 are integrally welded. The drain valve 21 is detachably connected to the mounting plate 22 through nut bottom holes of second nuts 221. In order to install the drain valve 21 more stably, in some implementation modes, the drain valve assembly 2 further includes an upper pressing plate 27. The upper pressing plate 27 is provided with one or more through holes (not shown in the figure), each through hole is correspondingly provided with a second bolt 222, and the mounting plate 22 is provided with the second nuts 221 corresponding to the second bolts 222. The second bolts 222 penetrate through the through holes of the upper pressing plate 27 and are connected to the second nuts 221, so that the upper pressing plate 27 presses a joint between the drain valve 21 and the mounting plate 22. In order to further improve and optimize a waterproof effect, a joint between a side wall of the mounting plate 22 and the frame 23 is coated with waterproof glue to prevent water leakage at a connection gap between the mounting plate 22 and the frame 23.

According to the embodiment of the present application, the drain valve 21 is in sealed connection to the mounting plate 22, the mounting plate 22 is connected to the inner wall of the frame 23, and the bottom of the frame 23 is welded to the connecting bottom plate 24. The frame 23 plays a role of connecting the mounting plate 22 with the connecting bottom plate 24. The mounting plate 22 is capable of mounting and fixing the drain valve 21. The upper pressing plate 27 presses the drain valve 21 to improve sealing performance between the drain valve 21 and the mounting plate 22. The drain valve assembly 2 is connected to the battery cabinet through the connecting bottom plate 24.

Referring to FIG. 5, the drain valve assembly 2 further includes a first sealing member 25, and the drain valve 21 is in sealed connection to the mounting plate 22 through the first sealing member 25.

The first sealing member 25 can be made of elastic materials such as rubber and silica gel, which can improve sealing performance of connection between the drain valve 21 and the mounting plate 22. Specifically, the drain valve 21 is in sealed connection to an upper surface of the mounting plate 22 through the first sealing member 25. After the drain valve 21 is assembled on the mounting plate 22, an upper surface of the first sealing member 25 is closely attached to the drain valve 21, and a lower surface of the first sealing member 25 is closely attached to the upper surface of the mounting plate 22 to form a first layer of sealing, thereby sealing a gap between the drain valve 21 and the mounting plate 22. In order to further improve a sealing effect, the second nuts 221 on the mounting plate 22 are preferably boss nuts. When the drain valve 21 is assembled too tightly on the mounting plate 22, bosses can be in contact with the drain valve 21 to limit the position of the drain valve 21 and prevent the sealing performance from being affected by the first sealing member 25 being crushed when the drain valve 21 and the mounting plate 22 are excessively assembled.

According to the embodiment of the present application, the drain valve 21 is in sealed connection to the mounting plate 22 through the first sealing member 25 so as to improve the sealing performance between the drain valve 21 and the mounting plate 22. The bosses of the second nuts 221 prevent the first sealing member 25 from being crushed by the drain valve 21.

Referring to FIG. 5, the drain valve assembly 2 further includes a second sealing member 26 arranged between the connecting bottom plate 24 and the lower cabinet body bottom plate 121.

The second sealing member 26 can be made of elastic materials such as rubber and silica gel, which can improve the sealing performance of connection between the connecting bottom plate 24 and the lower cabinet body bottom plate 121. Specifically, a lower surface of the second sealing member 26 is bonded to an upper surface of the connecting bottom plate 24 by a sealant. The second sealing member 26 is provided with second through holes 261 concentric with the first through holes 241, and the second through holes 261 are matched with the first through holes 241 in number and size. After the drain valve assembly 2 is assembled on the lower cabinet body bottom plate 121, an upper surface of the second sealing member 26 is closely attached to a lower surface of the lower cabinet body bottom plate 121 to form a second layer of sealing, thereby sealing a gap between the connecting bottom plate 24 and the lower cabinet body bottom plate 121. Preferably, the shape of the second sealing member 26 is consistent with that of the connecting bottom plate 24, which can further optimize the sealing effect.

According to the embodiment of the present application, the second sealing member 26 is arranged between the connecting bottom plate 24 and the lower cabinet body bottom plate 121 to improve the sealing performance between the connecting bottom plate 24 and the lower cabinet body bottom plate 121.

Figure 4:
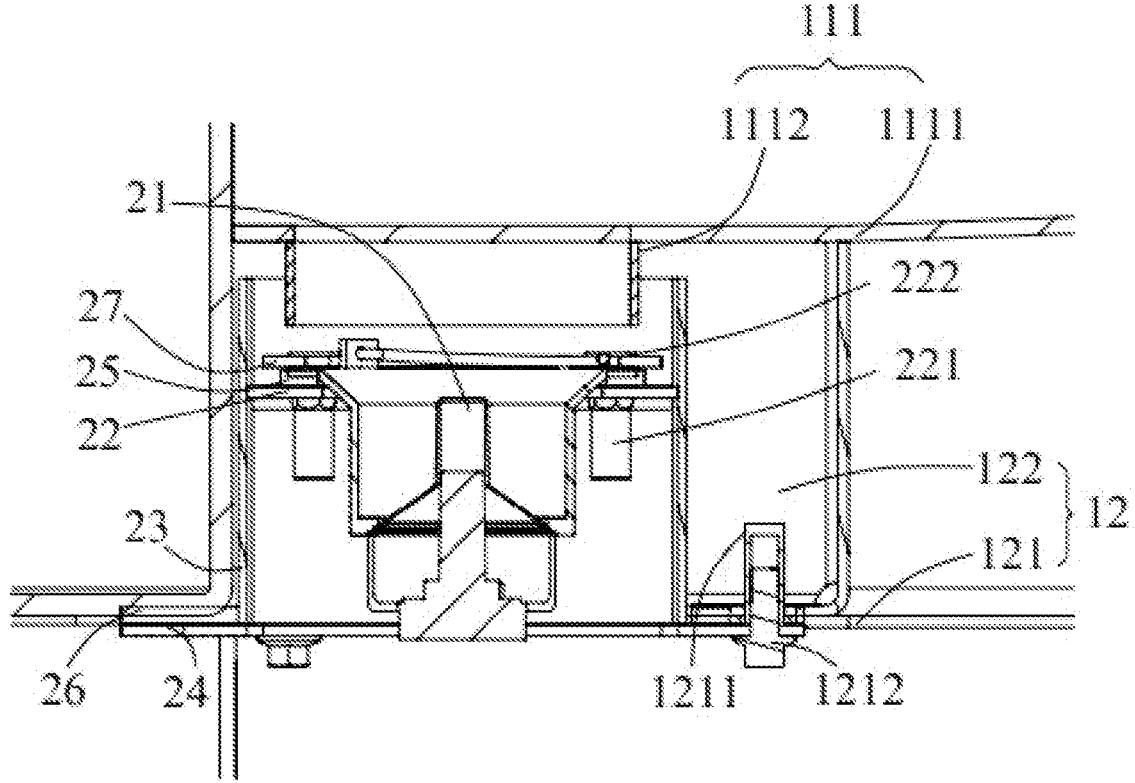
FIG. 4 is a partial enlarged view of a sectional view made along a line B-B in FIG. 2.
Figure 6:
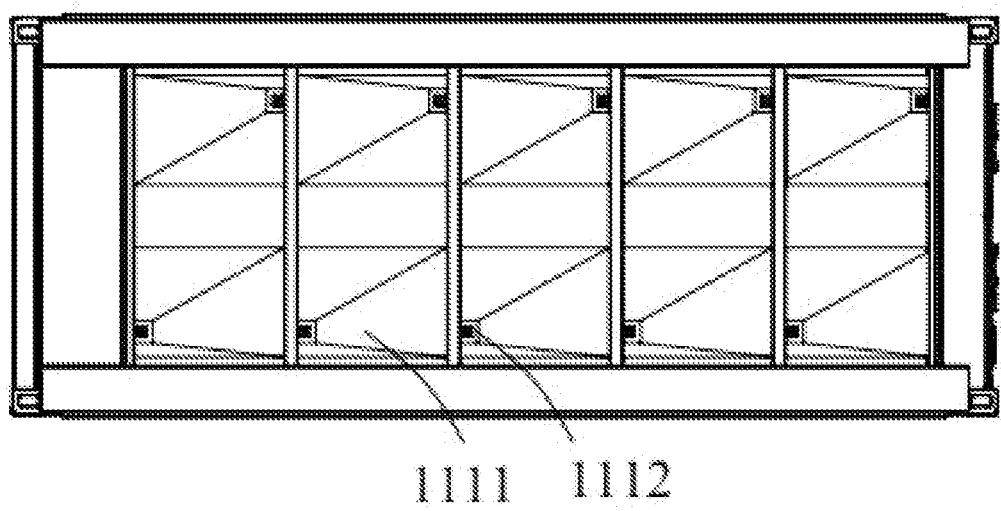
FIG. 6 is a schematic diagram of an upper cabinet body bottom plate disclosed by an embodiment of the present application.

Referring to FIG. 2, FIG. 4 and FIG. 6, the upper cabinet body bottom plate 111 includes a water guide plate 1111 and a water guide box 1112. An upper end of the water guide box

1112 is connected to the water guide plate 1111, and a lower end of the water guide box 1112 is in butt joint with the drain valve assembly 2.

The water guide plate 1111 can make the accumulated water on the upper cabinet body bottom plate 111 flow to the drain outlet 112 to prevent the accumulated water from accumulating at the bottom of the upper cabinet body 11.

The water guide box 1112 is a component connecting the water guide plate 1111 with the drain valve assembly 2, and the upper end of the water guide box 1112 is welded to the water guide plate 1111 as a whole. The lower end of the water guide box 1112 is in butt joint with the drain valve assembly 2.

Butt joint refers to mutual contact between end portions of various components. Specifically, butt joint means that an opening in the lower end of the water guide box 1112 corresponds to an opening in the upper end of the drain valve assembly 2 so that the accumulated water can flow into the drain valve assembly 2.

According to the embodiment of the present application, water flow in the cabinet body flows, along the water guide plate 1111, to the drain valve assembly 2 via the water guide box 1112 and is finally discharged out of the battery cabinet to realize one-way sealed drainage.

Referring to FIG. 2, according to the embodiment of the present application, the water guide box 1112 is arranged on the side, close to a door panel of the battery cabinet, of the upper cabinet body bottom plate 111.

The water guide box 1112 is arranged on the side close to the door panel of the battery cabinet. Correspondingly, the drain outlet 112 is formed in the side, close to the door panel of the battery cabinet, of the upper cabinet body bottom plate 111, and the drain valve installation port 122 is formed in the side, close to the door panel of the battery cabinet, of the lower cabinet body bottom plate 121. In some embodiments, the water guide box 1112 may be arranged at a left end of the side close to the door panel, which is not limited in this embodiment. The drain valve assembly 2 can be disassembled and assembled without going deep into the battery cabinet. Especially for a large battery cabinet with a large depth, disposing the water guide box 1112 on the side close to the door panel simplifies the steps of disassembling and assembling the drain valve assembly 2.

According to the embodiment of the present application, compared with an existing technical solution in which a drain outlet 112 is formed in a middle of a bottom plate, the water guide box 1112 is arranged on the side close to the door panel of the battery cabinet to reduce the operation difficulty of disassembling and assembling the drain valve assembly 2.

Referring to FIG. 4, according to the embodiment of the present application, a lower edge of the water guide box 1112 is lower than an upper edge of the frame 23, so that the frame 23 sleeves the water guide box 1112.

In order to prevent the water flow from splashing to an exterior of the drain valve assembly 2 when the water flow is large, the lower edge of the water guide box 1112 is lower than the upper edge of the frame 23 so that the frame 23 can sleeve the water guide box 1112. It can be understood that the water guide box 1112 and the frame 23 overlap each other in a height direction. A length and a width of the water guide box 1112 are smaller than those of the frame 23 to achieve a better nesting effect.

According to the embodiment of the present application, the lower edge of the water guide box 1112 is lower than the upper edge of the frame 23, which can prevent the water flow from splashing out of the drain valve assembly 2.

Referring to FIG. 6, according to the embodiment of the present application, the water guide plate 1111 is provided with a drainage structure. The drainage structure downwards inclines towards the position of the water guide box 1112.

The drainage structure can make the accumulated water flow to the drain outlet 112 smoothly. The inclination of the drainage structure towards the water guide box 1112 means that the water guide plate 1111 inclines towards the position of the water guide box 1112 to form an inclined plane, so that the position of the drain outlet 112 is located at a lowest point of the upper cabinet body 11, and the accumulated water accumulated on the upper cabinet body bottom plate 111 converges, under the action of gravity, to the drain outlet 112 along the inclined plane of the drainage structure, and is discharged out of the cabinet body 1 through the drain valve assembly 2.

According to the embodiment of the present application, the drainage structure downwards inclines towards the position of the water guide box 1112 so that the accumulated water can flow out of the battery cabinet to the greatest extent.

Figure 7:
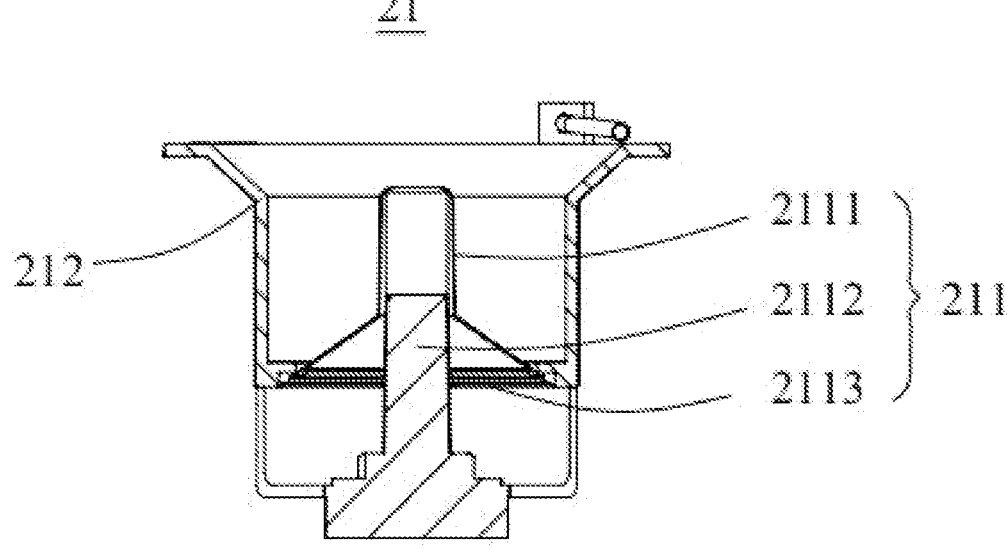
FIG. 7 is a schematic diagram of an internal structure of a closed-state drain valve disclosed by an embodiment of the present application.
Figure 8:
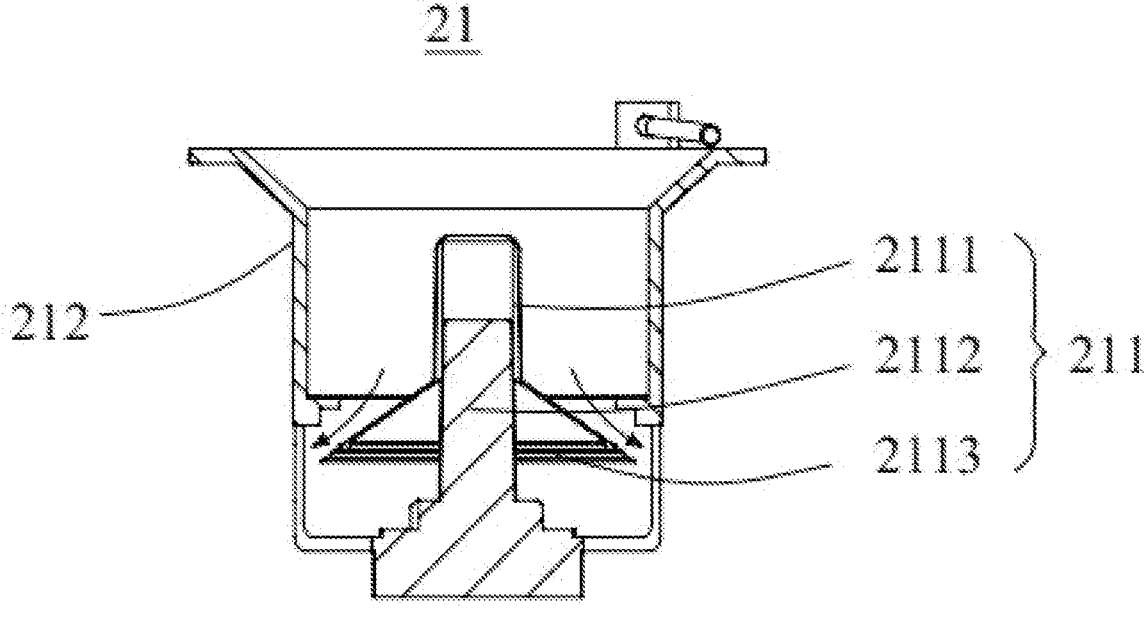
FIG. 8 is a schematic diagram of an internal structure of an opened-state drain valve disclosed by an embodiment of the present application; In the drawings, the drawings are not drawn to actual scale.

Referring to FIG. 7 and FIG. 8, according to the embodiment of the present application, the drain valve 21 includes a valve core assembly 211 and a shell 212. The valve core assembly 211 is arranged in the shell 212. The shell 212 is of a cylindrical structure, and the top of the cylindrical structure is provided with an outwards-turned edge.

The drain valve 21 implements basic functions such as direction control, pressure control or flow control by means of the valve core assembly 211. In the embodiment of the present application, the one-way sealed drainage function of the drain valve 21 is realized by the valve core assembly 211. The drain valve 21 can also be of other structures, as long as it can satisfy a drain function, such as a spring-type structure.

The shell 212 is of the cylindrical structure with the outwards-turned edge at the top. It can be understood that the shape of the shell 212 is similar to a funnel, which can collect the water flow and improve drainage efficiency. An edge of an upper open end of the shell 212 is in butt joint with the water guide box 1112, and the shell 212 is internally provided with a drainage channel.

According to the embodiment of the present application, the drain valve 21 includes the valve core assembly 211 and the shell 212. One-way sealed drainage can be realized through the valve core assembly 211. The water flow can be collected by the outwards-turned edge on the top of the shell 212.

Referring to FIG. 7 and FIG. 8, according to the embodiment of the present application, the valve core assembly 211 includes a metal valve core 2111, a guide rod 2112 and a third sealing member 2113. The metal valve core 2111 movably sleeves the guide rod 2112. Magnetic substances are arranged on the guide rod 2112. The magnetic substances generate magnetic force to make the metal valve core 2111 close the drain valve 21, and open the drain valve 21 when downward acting force exerted on the metal valve core 2111 is greater than a preset value.

The metal valve core 2111 is a main body of the valve core assembly 211. Movement modes of the metal valve core 2111 can be divided into a rotary mode, a translation type, etc. The metal valve core 2111 is arranged on the drainage channel in the shell 212, and the shape of the metal valve core 2111 is matched with that of a cross section of the drainage channel of the shell 212, and specifically, the shape of the cross section may be a circle or the like.

The shape of the guide rod 2112 is matched with that of a cross section of the metal valve core 2111, and specifically, the shape of the cross section may be a circle or the like so that the metal valve core 2111 can sleeve the guide rod 2112. An upper end of the guide rod 2112 is provided with magnetic substances, specifically a magnet or the like. The magnetic substances can generate upward magnetic force on the metal valve core 2111, so that the metal valve core 2111 seals the drainage channel.

The third sealing member 2113 may be made of elastic materials such as rubber and silica gel. Referring to FIG. 7, in a closed state of the metal valve core 2111, the third sealing member 2113 can improve the sealing performance of connection between the metal valve core 2111 and the shell 212. Specifically, when the metal valve core 2111 is in the closed state, an upper surface of the third sealing member 2113 is closely attached to a lower edge of the shell 212, so that a gap between the metal valve core 2111 and the shell 212 is sealed to achieve a third layer of sealing.

"Movably sleeves" means that the metal valve core 2111 is movable inside the shell 212. Specifically, when the metal valve core 2111 moves upwards to a first state (namely, the closed state of the drain valve 21) under the action of the magnetic force of the magnetic substances, the valve core assembly 211 seals the drainage channel; and when the downward acting force exerted, by the accumulated water, on the metal valve core 2111 is greater than the preset value, the metal valve core 2111 moves downwards to a second state (namely, the opened state of the drain valve 21), thereby conducting the drain valve 21 to drain water. Directions of arrows in FIG. 8 represent directions of the water flow. After the accumulated water is discharged, the metal valve core 2111 moves upwards again under the action of the magnetic force of the magnetic substances and returns to the first state, thereby sealing the drainage channel.

In addition, when an accident such as thermal runaway occurs inside the battery cabinet and after an air pressure inside the cabinet body 1 reaches a certain threshold, the metal valve core 2111 can be automatically opened to release the pressure to prevent the accident.

According to the embodiment of the present application, the valve core assembly 211 includes the metal valve core 2111, the guide rod 2112 and sealing rubber 2113. When the downward acting force exerted on the metal valve core 2111 is greater than the preset value, the drain valve 21 is opened to realize automatic drainage. The magnetic substances on the guide rod 2112 generate the magnetic force to make the metal valve core 2111 close the drain valve 21. Existing spring-loaded drainage assemblies are prone to rust during use, and consequently, drainage or seal failures are likely to happen. According to the embodiment of the present application, the magnetic substances control the valve core assembly 211 to be opened and closed so that automatic drainage can be accurately realized; and the sealing performance of the valve core assembly 211 can be improved by the third sealing member 2113.

Although the present application has been described with reference to the preferred embodiments, various improvements can be made thereto and components thereof can be replaced with equivalents without departing from the scope of the present application. In particular, the technical features mentioned in the various embodiments can be combined in any manner as long as there is no structural conflict. The present application is not limited to the specific embodiments disclosed herein, but rather includes all technical solutions falling within the scope of the claims.

What is claimed is:

1. A battery cabinet, comprising:

a cabinet body, wherein the cabinet body comprises an upper cabinet body and a lower cabinet body, the upper cabinet body is used for accommodating battery cells, the bottom of the upper cabinet body is provided with an upper cabinet body bottom plate, the upper cabinet body bottom plate is provided with a drain outlet, and the lower cabinet body comprises a lower cabinet body bottom plate which is provided with a drain valve installation port; and a drain valve assembly which is installed in the drain valve installation port and is in butt joint with the drain outlet, wherein the drain valve assembly comprises a drain valve, a mounting plate, a frame and a connecting bottom plate; the mounting plate is connected to an inner wall of the frame; the drain valve is in sealed connection to the mounting plate; the connecting bottom plate is arranged at the bottom of the frame; and the frame is connected to a bottom surface of the lower cabinet body bottom plate through the connecting bottom plate.

2. The battery cabinet according to claim 1, wherein the drain valve assembly is installed in the drain valve installation port from bottom to top.

3. The battery cabinet according to claim 1, wherein the drain valve assembly further comprises a first sealing member, and the drain valve is in sealed connection to the mounting plate through the first sealing member.

4. The battery cabinet according to claim 1, wherein the drain valve assembly further comprises a second sealing member, and the second sealing member is arranged between the connecting bottom plate and the lower cabinet body bottom plate.

5. The battery cabinet according to claim 1, wherein an upper cabinet body bottom plate comprises a water guide plate and a water guide box; an upper end of the water guide box is connected to the water guide plate; and a lower end of the water guide box is in butt joint with the drain valve assembly.

6. The battery cabinet according to claim 5, wherein the water guide box is arranged on the side, close to a door panel of the battery cabinet, of the upper cabinet body bottom plate.

7. The battery cabinet according to claim 5, wherein a lower edge of the water guide box is lower than an upper edge of the frame, so that the frame sleeves the water guide box.

8. The battery cabinet according to claim 5, wherein the water guide plate is provided with a drainage structure; and the drainage structure downwards inclines towards the position of the water guide box.

9. The battery cabinet according to claim 1, wherein the drain valve comprises a valve core assembly and a shell; the valve core assembly is arranged in the shell; and the shell is of a cylindrical structure, and the top of the cylindrical structure is provided with an outwards-turned edge.

10. The battery cabinet according to claim 9, wherein the valve core assembly comprises a metal valve core, a guide rod and a third sealing member; the metal valve core movably sleeves the guide rod; the guide rod is provided with magnetic substances; and when the magnetic substances generate magnetic force to make the metal valve core close the drain valve and downward acting force exerted on the metal valve core is greater than a preset value, the drain valve is opened.

* * * * *